May 31, 1938.  F. E. STAHL ET AL  2,119,447
EMERGENCY ANTISKID DEVICE
Filed Aug. 18, 1934  3 Sheets-Sheet 1
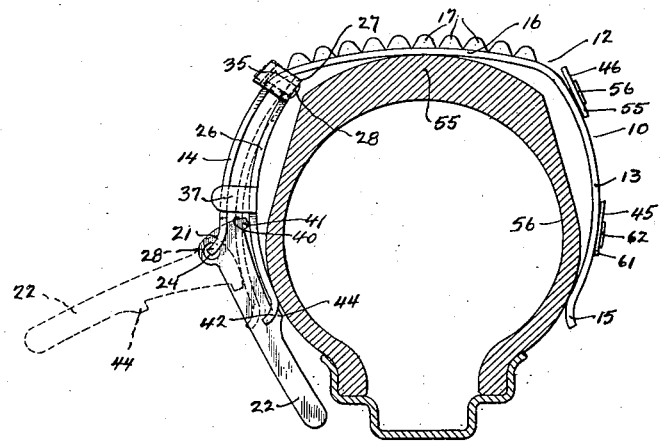
Fig. 1.
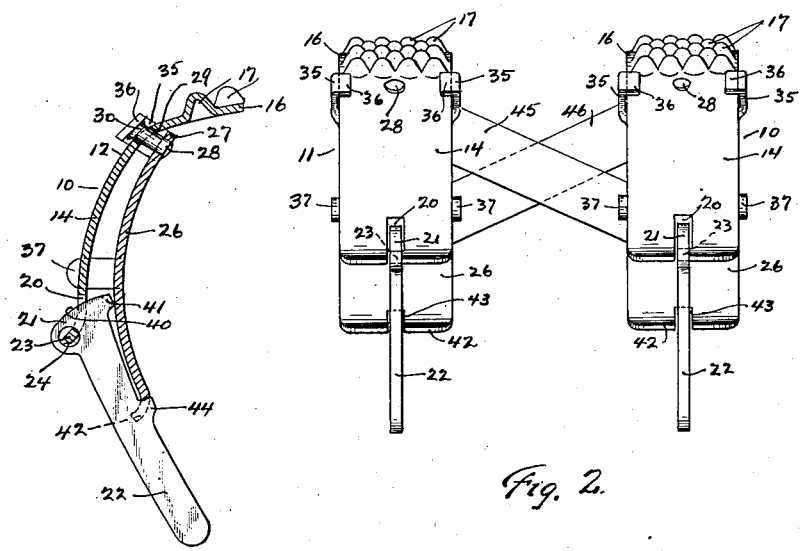
Fig. 2.
Fig. 3.
INVENTORS
FRANK E. STAHL
and RAYMOND J. KIEFFER
By
ATTORNEY May 31, 1938.   F. E. STAHL ET AL   2,119,447
EMERGENCY ANTISKID DEVICE
Filed Aug. 18, 1934   3 Sheets-Sheet 2

INVENTORS
FRANK E. STAHL
and RAYMOND J. KIEFFER
By
ATTORNEY

May 31, 1938.　　F. E. STAHL ET AL　　2,119,447
EMERGENCY ANTISKID DEVICE
Filed Aug. 18, 1934　　3 Sheets-Sheet 3

INVENTORS
FRANK E. STAHL
and RAYMOND J. KIEFFER
By
ATTORNEY

Patented May 31, 1938

2,119,447

UNITED STATES PATENT OFFICE 2,119,447

EMERGENCY ANTISKID DEVICE

Frank E. Stahl, Tonawanda, and Raymond J. Kieffer, Getzville, N. Y., assignors to Columbus McKinnon Chain Corporation, Tonawanda, N. Y., a corporation of New York Application August 18, 1934, Serial No. 740,522

8 Claims. (Cl. 152—225)

It is well known to those skilled in the art that emergency anti-skid devices of present day construction either have a flexible strap passing across the inside of the rim or felloe of the wheel or have their ends attached to fixed points on the felloe or rim. In some cases the strap employed in such devices is too wide to pass between the spokes of the wheel, particularly wire spoke wheels, and such devices as have their ends attached directly to the felloe or rim are objectionable, since that portion of the anti-skid device which contacts with the tire comes at the same place each time the anti-skid device contacts with the pavement, with detrimental results to the tire.

It has been the principal object of our invention to provide an anti-skid device which does not require a strap or other fixed securing means to hold it in place.

Another object has been to provide a device of this nature which may be used upon any type of wheel, and particularly on wheels of the disc type or those of the wire wheel type where the spokes are too closely spaced to permit the passage of the ordinary flexible strap.

Moreover, our device is of such a nature that it is held in place entirely by means of the tire with which it is used, and is one which can be easily and quickly applied to the tire, and when so applied, will be securely held in place.

Furthermore, our device is collapsible for convenience in storage and is one which may be inexpensively manufactured.

Moreover, our device does not conform exactly to the cross-sectional contour of the tire but space is provided between the side arm and the tire-engaging means to compensate for the expansion of the tire when contacting with the pavement. Should the expansion be greater than the space provided for it, our device is made flexible so that it can spring and thus compensate for any added spreading action upon the tire without causing injury to the fabric thereof.

The above objects and advantages have been accomplished by the device shown in the accompanying drawings, of which:

Fig. 1 is a cross-sectional view of a tire with our device applied thereto.

Fig. 2 is a side elevation of our complete device.

Fig. 3 is an enlarged, fragmentary sectional view of the clamping mechanism of our device.

Figure 8:
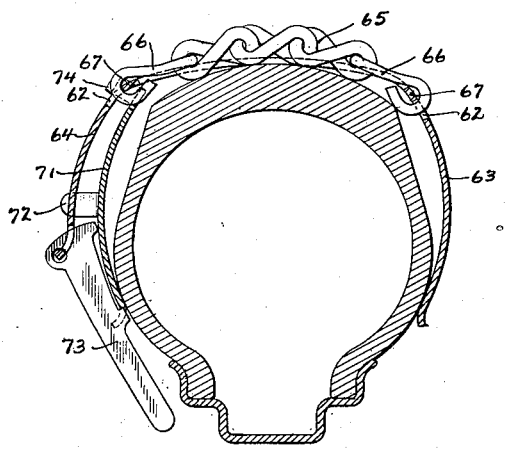
Fig. 8 is a sectional elevation of a modified form of invention taken on line 8—8 of Fig. 9.
Figure 9:
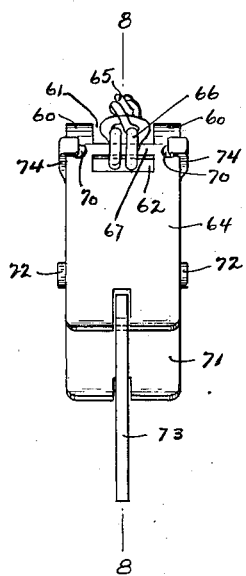
Fig. 9 is a side elevation of the form of invention shown in Fig. 8.

Our device is designed to be slipped over and around the tire in such manner that it may be held in place by contact with the side walls thereof. The device comprises preferably two anti-skid members 10 and 11, each a substantial duplicate of the other, and each formed with a body part 12 which is of general inverted U-shape, as shown in Fig. 1. The body part is provided with a tire-engaging side arm 13 and with a non-tire-engaging side arm 14. The lower end 15 of the side arm 13 is preferably bent outwardly so that it can be conveniently slipped over the tire, and when in position, as shown in Fig. 1, this end is below the lateral axis of the tire so that when it is clamped in position, it will be securely held in engagement with the side wall of the tire. The side arms 13 and 14 are connected together by means of a tread portion 16 which is preferably curved to a radius larger than the tread arc of the tire. This tread may be provided with any suitable anti-skid surface. For convenience, in the drawings we have shown a series of tapered protuberances 17 which are preferably formed by pressing the metal upwardly at any desired number of points. This tread is, however, only illustrative, and it is obvious that any other suitable configuration may be employed, but preferably of such a design as can be pressed out of the metal forming the body of the anti-skid member. The tread may, if desired, be made in the form of a separate element, as for example, a chain as shown in Figs. 8 and 9.

The side arm 14 is preferably shorter than the side arm 13 and it is provided in its lower end with a slot 20 for the reception of the upper end 21 of a clamping lever 22. The slot is not cut all the way through to the edge of the lower end of the side arm, but a portion 23 is allowed to remain, which provides a pivotal connection for the clamping lever 22 and with which the hole 24 of this lever engages. The side arm 14 is proportioned so as to have considerable distance between it and the side wall of the tire, as shown in Fig. 1, and in this space is arranged a clamp arm 26. The upper end 27 of this arm is loosely attached to the upper end of the side arm 14, preferably at the point where this side arm joins the tread portion 16. This clamp arm may be loosely secured in any desired manner, but we preferably provide a detent pin 28 which is securely riveted to the end 27 of the clamp arm and extends through an aperture 29 formed in the side arm 14. This aperture 29 is somewhat larger than the detent pin 28 so as to permit a limited amount of free oscillatory movement of the clamp arm 26. The detent pin is provided with a head 30 which may be formed by riveting. In addition to the detent pin 28, we preferably form a detent arm 35 at each side of the upper end 27 of the clamp arm. These detent arms loosely engage with the side edges of the side arm 14, and each of them is provided with an inturned end 36 which extends over the outer surface of the side arm 14 and is in interspaced relation therewith so as to permit free movement of the clamp arm. Guide lugs 37 are also formed on each side of the clamp arm and at points about midway their length, and these guide arms extend outwardly and are of such a length that they will engage the side edges of the side arm 14, and thus serve to keep the clamp arm and the side arm 14 in registering position. The clamp arm 26 is substantially coextensive with the non-tire-engaging arm 14.

Suitable cam means are provided between the clamp arm 26 and the adjacent side arm 14 and the clamping lever 22 is, therefore, provided at its upper end with a cam face 40 which is engageable with the outer face of the clamp arm, as shown in dotted lines in Fig. 1, when the clamp arm is being moved to its locked position. The clamping lever is also provided at the end of the cam face 40 with a detent lug 41. When the lever is in its closed or locked position, as shown in Figs. 1 and 3, the detent lug 41 will have been moved in contact with the curved surface of the clamp arm 26 to a point where it will be a slight distance beyond a point coincident with a line drawn from the center of the radius of the clamp arm to the center of the pivotal connection of the clamping lever. Obviously, when the detent lug has moved beyond this point the pressure created by the lever will serve to keep the lever in its locked position. The lower end 42 of the clamp arm 26 is curved outwardly so as to permit the device to be more readily engaged with the tire. A slot 43 is formed in this edge of the clamp arm for engagement with a lock lug 44, carried by the clamping lever and brought into registration and engagement with the slot when the clamping lever has reached its locked position, as shown in Figs. 1 and 3. The engagement of the lock lug 44 with the slot 43 centralizes the clamping lever and serves to hold it in engaged position.

As hereinbefore stated, we preferably use two anti-skid members 10 and 11. It will, however, be obvious that each of these members is an independent structure and capable of being clamped to and held in place upon a tire, so that while we have shown two of these members being used in the preferable form of our device, it is obvious that, if desired, a single member may be used.

Figure 4:
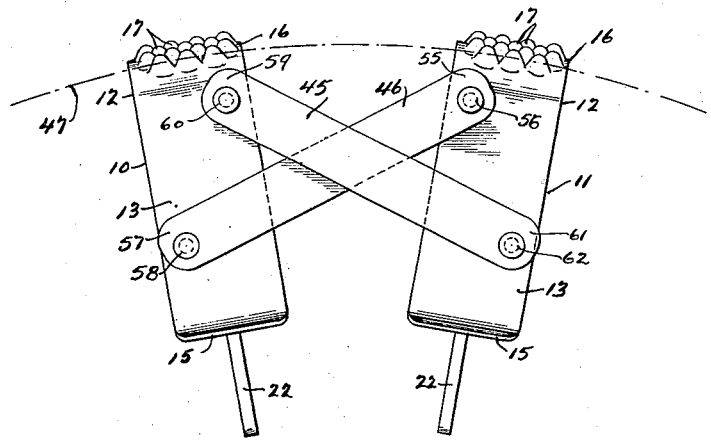
Fig. 4 is a side elevation of our device viewed from the connecting link side and showing the members arranged at an angle to each other.
Figure 5:
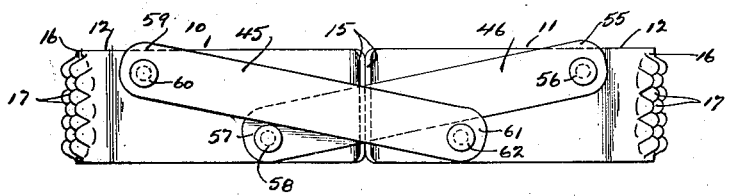
Fig. 5 is a view of our device collapsed for storage.

When we use two anti-skid members as shown in the drawings, they are preferably connected together by means of connecting links 45 and 46. These links are arranged at the side of the device where the side arms 13 are located, and they are pivotally connected to such side arms. As shown in the drawings, these side arms may take various forms and be connected to the members in various ways. The preferable manner of arrangement and connection is, however, shown in Figs. 2, 4, and 5. In this form, the links 45 and 46 have their opposite ends attached to opposite anti-skid members and are crossed at substantially their central portions. For instance, the upper end 55 of the link 46 is connected at a point near the top of the side arm 13 of the member 11 by a pivot 56 and at its lower end 57 at a point near the bottom of the side arm 13 of the member 10 by a pivot 58. In like manner, the link 45 has its upper end 59 secured to the upper portion of the side arm 13 of the member 10 by a pivot 60 and its lower end 61 is secured to the side arm 13 of the opposite member 11 near its lower end by a pivot 62. By the preferred arrangement just above described, the members are moved in opposite directions when being adjusted to the tire or being folded up, as shown in Fig. 5. In other words, when the members are moved so that their major axes are radially arranged with respect to a circle of substantialy the same diameter as the tire to which they are to be applied, both members will be adjusted uniformly about a radial axis passing through the center of the device. The dot and dash line 47 in Fig. 4 represents the outer contour of a tire to which the device is applied, and in this figure the anti-skid members 10 and 11 have been so adjusted that the inner faces of the tread portions 16 thereof lie tangent with those portions of this circular surface over which they are disposed. In this figure, therefore, the anti-skid members are arranged in operative relation with one another, whereas, in Fig. 2, the members have been shown in parallel relation for clearness of illustration.

When it is desired to fold the device for compactness in storage, the members are moved so that the ends 15 and 42 of the side arm 13 and clamp arm 26, respectively, will approach each other until the members lie in substantially the same horizontal plane as shown in this figure.

Figure 6:
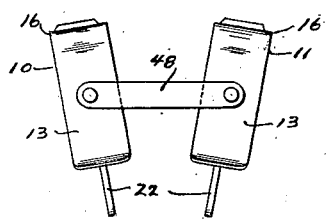
Figs. 6 and 7 are side elevations of devices of modified construction.
Figure 7:
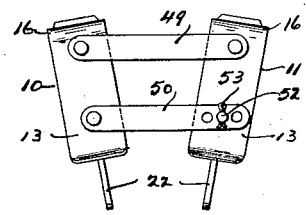

Instead of having two links 46 and 47 arranged to cross each other, one single link 48 may be employed to connect the anti-skid members 10 and 11, as shown in Fig. 6. If desired, two substantially parallel links 49 and 50 may be employed, as shown in Fig. 7, instead of two links which are crossed, as shown in Fig. 4. When connected by two links, as shown in Fig. 7, the relative radial position of the members must first be determined in accordance with the size of the tire to which the device is to be applied. With such radial relationship fixed, our device will be applicable to tires of various sizes within reasonable limits, but should it be desired or found necessary to change the radial relationship, this may be done by making one of the links adjustable, and to illustrate this in somewhat diagrammatic manner, we have shown link 50 as having a number of holes 51 near one of its ends. One of these holes will be engaged with a pin 52 carried at the lower end of the side arm of one of the anti-skid members, and such engagement may be retained by means of a cotter pin 53 or other suitable device.

In some cases it may be desirable to rigidly fasten the two anti-skid members together in definite radial relationship. This structure might be useful where it is not found desirable or necessary to collapse the device for convenient storage. Furthermore, it may be desirable to provide one rigid metallic link and one flexible link of suitable material such as fabric or woven wire. Such modifications are within the scope of our invention.

In the form of invention shown in Figs. 8 and 9, the tread portion 60 is provided with a centrally arranged slot 61 and with a short interspaced slot 62 at each end thereof. The slots 62 extend down into the side arms 63 and 64. The tread of this modification is in the form of a chain 65 which is provided with an end hook 66 at each end of the chain, each hook passing through one of the slots 62 and engaging the cross bar 67 formed between one end of the slot 61 and one of the slots 62.

In this form of invention, because of the provision of the slots, it is necessary to have two detent pins 70, one arranged preferably at each side of the slot 62 and secured to the clamp arm 71. The guide lugs 72 are formed on this clamp arm as in the other form and a clamping lever 73 is employed. Detent arms 74, similar to those of the other form of invention, are also employed. When this form of device is applied to a tire, as shown in Fig. 8, the anti-skid chain 60 will extend through the slot 61 and be exposed to the surface of the pavement.

From the foregoing it will be obvious that when our device is to be used, the clamping levers 22 are moved to the dotted line position of Fig. 1 and, the anti-skid members having been set in approximate radial relationship, the device is slipped over the tire with which it is to be used. When the under side of the tread portion has been brought in contact with the tread portion 55 of the tire 56, shown in Fig. 1, the clamping levers 22 are forced downwardly and, as they are so moved, the cam face 40 of each will be forced against the outer curved surface of the clamp arm 26 and thus serve to force the lower end of this arm in contact with the tire wall, thus drawing the device toward that side of the tire and causing the side arm 13 to be drawn in contact with the opposite tire wall. The parts are so proportioned that when the detent lug 41 on the clamping lever 22 has been brought opposite the highest point on the outer curved surface of the clamp arm 26, the device will be in its maximum clamping position. A slight further movement of the clamping lever is permitted so as to bring the detent lug 41 at a point beyond the high point of the curved surface of the clamp arm when the clamping lever is in locked position. As hereinbefore pointed out, when the clamping lever is moved to its locked position, the lock lug 44 will engage the registering slot 43 in the lower end of the clamp arm and thus serve to retain the clamping lever in position and prevent sidewise movement thereof.

Obviously, the modifications herein referred to and other modifications of the details herein shown and described may be made without departing from the spirit of our invention or the scope of the appended claims, and we do not, therefore, wish to be limited to the exact embodiment herein shown and described, the form and modifications shown being merely a preferred embodiment thereof.

Having thus described our invention, what we claim is:

1. An anti-skid device comprising an anti-skid member having a body, said body being formed with two flexible side arms, and a flexible tread portion connecting such side arms, one of said arms being engageable with the side wall of the tire, a clamp arm arranged adjacent the other side arm and formed in its lower edge with a slot, and a clamping lever pivotally carried by the last mentioned side arm, comprising a cam portion and a detent lug, both engageable with the curved surface of the clamp arm, said clamping lever being disposed in the slot of the clamp arm when the clamping lever is in its clamping position.

2. An anti-skid device comprising an anti-skid member having a body, said body being provided with two flexible side arms and a flexible tread portion connecting the said side arms, a clamp arm arranged adjacent one of the side arms, a detent pin carried by the clamp arm for connecting the clamp arm to said side arm, guide lugs carried by the clamp arm for engagement with the said side arm, and cam means arranged between the clamp arm and the said side arm, whereby the device may be securely clamped to the side walls of a tire.

3. An anti-skid device comprising an anti-skid member having a body, said body being provided with two flexible side arms and a flexible tread portion connecting the said side arms, a clamp arm arranged adjacent one of the side arms, a detent pin carried by the clamp arm for connecting the clamp arm to said side arm, detent arms carried by the clamp arm and engaging said side arm, guide lugs carried by the clamp arm for engagement with said side arm, and cam means arranged between the clamp arm and said side arm, whereby the device may be securely clamped to the side walls of a tire.

4. An anti-skid device comprising an anti-skid member having a body, said body being formed with two flexible side arms, and a flexible tread portion connecting such side arms, one of said arms being engageable with the side wall of the tire, a clamp arm arranged adjacent the other side arm, a clamping lever pivotally carried by the last mentioned side arm, comprising a cam portion and a detent lug, both engageable with the curved surface of the clamp arm, and guide lugs carried by the clamp arm and engageable with the side arm of the body.

5. An anti-skid device comprising two anti-skid members, each member comprising a body formed with side arms and a tread portion, clamping means formed on each member and engageable only with the tire, and one-piece links pivotally connected at each of their ends to the side arms on each side of the two anti-skid members for connecting the same together.

6. An anti-skid device comprising two anti-skid members, each member comprising a body formed with side arms and a tread portion, clamping means formed on each member and engageable only with the tire, and intercrossing link means pivotally connected to the side arms of the members for connecting the same together.

7. An anti-skid device comprising an anti-skid member having a body, said body being formed with a tire-engaging side arm at one end thereof and with a non-tire-engaging side arm at the opposite end thereof, a clamp arm carried by the non-tire-engaging arm and arranged between the tire and the last mentioned arm, a detent pin carried near the upper end of the clamp arm for connecting said arm to the non-tire-engaging arm, the axis of said pin being arranged substantially at right angles to the face of the clamp arm and loosely passing through the non-tire-engaging arm, and cam means arranged between the clamp arm and the non-tire-engaging arm, whereby the device may be securely clamped to the side wall of a tire.

8. An anti-skid device comprising two anti-skid members, each member comprising a body formed with a tire-engaging side arm at one end thereof and with a non-tire-engaging side arm at the opposite end thereof and a clamp arm carried by the non-tire-engaging side arm and arranged between the tire and the last mentioned side arm for engagement with the wall of the tire, and one-piece links pivotally connected at each of their ends for pivotally connecting together the side arms of the two anti-skid members on each side of the tire.

FRANK E. STAHL.
RAYMOND J. KIEFFER.